United States Patent

[11] 3,564,342

| [72] | Inventors | Terry D. Sanders;<br>Lalan G. Miller, Pittsburgh, Pa. |
|---|---|---|
| [21] | Appl. No. | 826,978 |
| [22] | Filed | May 22, 1969 |
| [45] | Patented | Feb. 16, 1971 |
| [73] | Assignee | Westinghouse Electric Corporation<br>Pittsburgh, Pa.<br>a corporation of Pennsylvania |

[54] MOTOR CONTROL SYSTEM
9 Claims, 1 Drawing Fig.
[52] U.S. Cl. .................................................... 318/93,
318/104, 318/111
[51] Int. Cl. ...................................................... H02p 1/16
[50] Field of Search ....................................... 318/62, 64,
90, 93, 83, 104, 111

[56] References Cited
UNITED STATES PATENTS
| 3,205,420 | 9/1965 | Cobb | 318/104X |
| 3,317,802 | 5/1967 | Ogden | 318/104X |

*Primary Examiner*—B. Dobeck
*Attorneys*—F. H. Henson, R. G. Brodahl and C. J. Paznokas

ABSTRACT: Disclosed is a system for operating a chopper-controlled series-parallel plural motor network, for instance the four traction motors of a vehicle (such as a rapid transit railway car) at a fraction of the line voltage per motor during a starting phase, by controlling the chopper in response to a comparison of the motor voltage and the line voltage thereby to regulate the motor voltage to a desired fraction of the line voltage, for example 25 percent of the line voltage per motor in the four motor case.

PATENTED FEB 16 1971
3,564,342
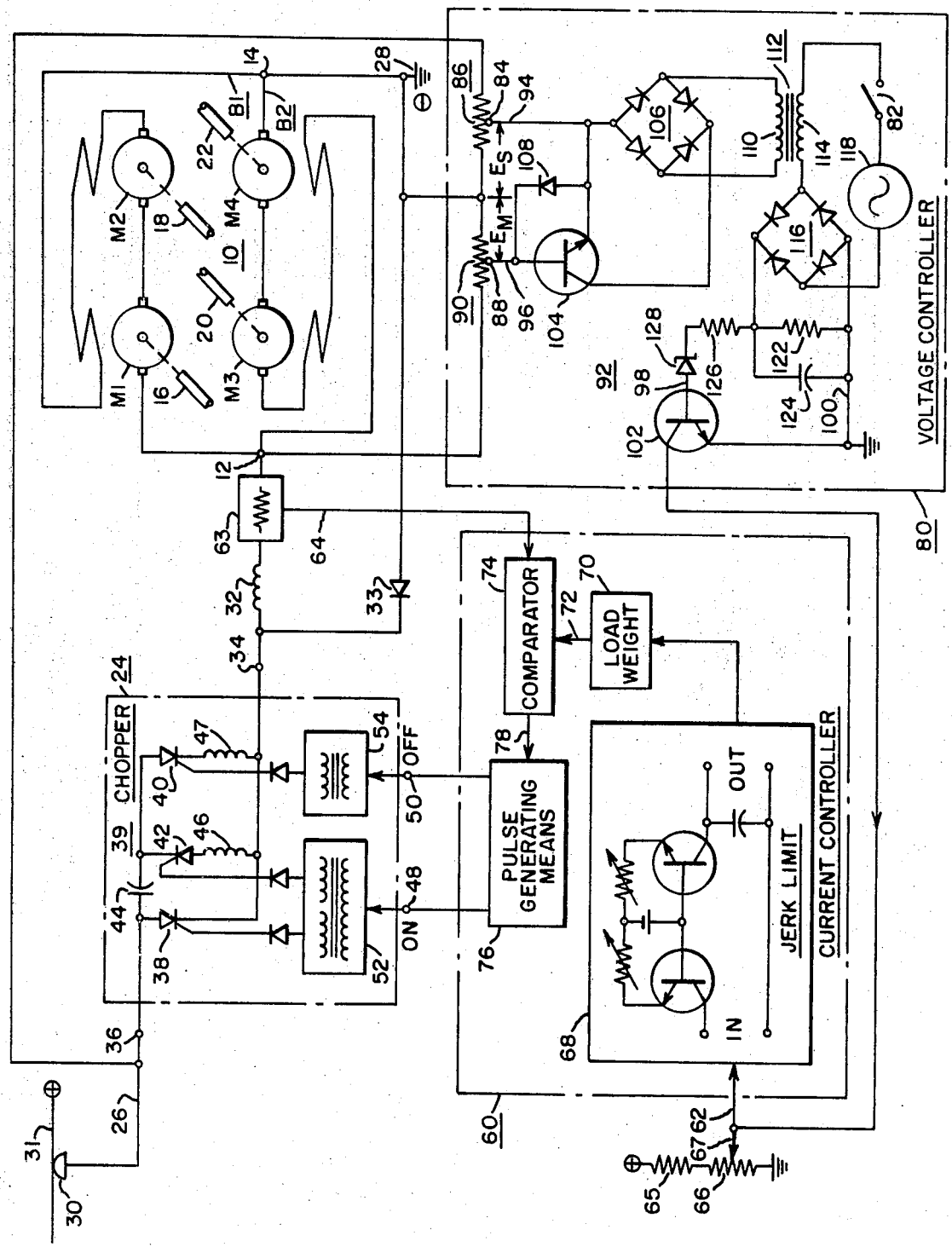
WITNESSES:
Bernard P. Gingay
James F. Young
INVENTORS
Terry D. Sanders &
Lalan G. Miller.
BY
Clement J. Paynokas
ATTORNEY 3,564,342

1

MOTOR CONTROL SYSTEM

BACKGROUND OF THE INVENTION

In cam-controlled railway traction systems, a starting position of the controller (motorman's handle, or automatic) connected the four motors of a car in series so that on start, each motor was subjected to one quarter line voltage. A subsequent position of the controller connected the four motors in a series-parallel network which was connected to the line through a resistor selected to subject the network to one-half line voltage thereby subjecting each motor to quarter line voltage. Thereafter as the car picked up speed, the resistance was incrementally reduced to increase the line voltage component applied to the motors.

A new mode of controlling traction motors disclosed in U.S. Pat. application Ser. No. 711,109, filed by John M. Mills on Mar. 6, and entitled CONTROL SYSTEM FOR TRACTION MOTORS, employs a controlled chopper which regulates the motor current to a desired value by turning the chopper on when the actual motor current drops below the desired value, and turning the chopper off when the actual motor current rises above the desired value, thus controlling the average ON time of the chopper in accordance with a requested or desired value of motor current. When a chopper is used to control the accelerating current of a group of four DC series motors, the most desirable circuit connection is two motors in series and two series groups in parallel. However, if this circuit must run in train with conventional series-parallel cam control, then the motors must first be connected four in series.

SUMMARY OF THE INVENTION

The invention is primarily directed to a control arrangement for limiting the starting voltage of each motor in a chopper controlled series-parallel network of motors to a predetermined fraction of the supply voltage without having to connect all the motors in series during the starting phase.

In accordance with one embodiment of the invention voltages proportional to the supply voltage and the voltage across a series-parallel plural motor system are compared to each other. When the motor system voltage is below a predetermined fraction of the supply voltage the chopper is turned on, and when the motor system voltage is above the supply voltage the chopper is turned off. Thus regulating the motor system voltage to a predetermined fraction of the supply volts per motor.

An object of the invention is to provide an arrangement for holding the motor voltage in a chopper controlled motor system at a predetermined fraction of the supply voltage during a starting phase thus eliminating the need for switching the motors in a series string during startup.

Another phase of the invention is directed to a voltage regulating scheme having a novel circuit for producing an output signal in response to voltage comparison.

Other and further objects and advantages of the invention will become apparent from the detailed description herein taken with the accompanying single figure drawing which illustrates a preferred embodiment of the invention.

DESCRIPTION OF THE DRAWING

The drawing is a diagram of a control arrangement for a railway car traction motor system incorporating the invention.

DESCRIPTION OF THE PREFERRED EMBODIMENT

As seen in the drawing, a motor system 10 connected between power terminals 12 and 14 includes four DC (direct current) series motors M1, M2, M3 and M4 connected in series-parallel. The armatures of the motors are shown coupled to driving axles 16, 18, 20 and 22 of a vehicle, for example a rapid transit car. Thus the motor circuit 10 comprises two parallel branches B1 and B2, each having two motors in series. The motor circuit 10 and a chopper 24 are connected in series between input power lines 26 and 28. Line 28 may for example be connected through the vehicle wheels to a ground rail, while line 26 may be connected through a trolley 30 to a trolley line 31. Thus the chopper 24 is in position to control power applied to the motor system from the input lines 26 and 28. A reactor 32 is connected in series between the chopper 24 and the motor system 10 to smooth the motor current. A free wheeling diode 33 is connected across the motors and reactor 32.

Since the invention is concerned with operation of the motors only in the motoring mode (as distinguished from the generating or braking mode), various switches and other accessories necessary for switching the system from motoring to braking and vice versa are not shown.

Basically, a chopper is a switch which is operated on and off (opened and closed) rapidly. Utilizing a chopper as a control element, a circuit may be controlled by controlling the ratio of ON time to OFF time of the chopper. Thus, the average current in a line may be controlled by inserting a chopper in series in the line and controlling the ratio between the lengths of successive ON and OFF periods of the chopper. Although any suitable chopper may be employed, the one shown at 24 is an example of a preferred type which is also disclosed in the aforementioned Pat. application, Ser. No. 711,109.

The particular chopper 24 shown by way of example, is provided with main terminals 34 and 36, and further includes a thyristor 38 for carrying main load current between terminals 34 and 36 when turned on. A commutating circuit 39 is connected across the cathode-anode path of thyristor 38 for commutating or turning off thyristor 38 in response to an OFF signal supplied to the chopper. The commutating circuit 39 includes thyristors 40 and 42, a capacitor 44 and a reactor 46, interconnected as shown. A protective reactor 47 is inserted in series with the cathode of thyristor 40 for the protection of that thyristor. The chopper is provided with respective ON and OFF input lines 48 and 50, respectively, line 48 being connected to the gate circuits of thyristors 38 and 42 through a pulse transformer 52, while line 50 is connected to the gate circuit of thyristor 40 through a pulse transformer 54. For isolation, the gates of thyristors 38 and 40 are fed from separate secondaries of transformer 52. It will be appreciated that the gate circuits of the thyristors are simplified so that protection networks and control connections to the thyristor cathodes are not shown. Likewise single line symbolic technique is used in illustrating the input and output lines of transformers 52 and 54, and the later described circuits for providing the control ON and OFF pulses to the chopper 24.

In considering the operation of the chopper 24 per se, assume that there is power in the circuit in which the main chopper terminals 34 and 36 are connected. To start the chopper, thyristor 40 is first turned on by a pulse supplied to its gate, thus charging capacitor 44 through thyristor 40 from the power applied to the main input terminals 34 and 36 of the chopper. When capacitor 44 becomes charged, the current through thyristor 40 goes to zero and that thyristor turns off. The chopper is then ready for operation and is turned by simultaneously firing thyristors 38 and 42 in response to gate signals applied thereto. This does two things. It connects the power input line 26 to the motor system 10 through thyristor 38. Simultaneously, it sets up an oscillatory circuit consisting of capacitor 44 and reactor 46. Current will flow from the capacitor through thyristor 38 into inductor 46 and then from the inductor back through thyristor 42 to the capacitor with voltage on the capacitor then reversed. Thyristor 42 turns off when the current through it goes to zero. Thyristor 38 will remain conducting (ON). The chopper is now in its ON or conductive condition with substantially full motor current flowing through thyristor 38.

To turn the chopper off, thyristor 40 is again turned on, thus applying the reverse charge of capacitor 44 as a back-bias across thyristor 38 thereby turning thyristor 38 off. This of course turns the chopper 24 off. The capacitor 44 will again charge through thyristor 40 from the motor circuit. By controlling the gate pulses applied to thyristors 38, 40 and 42, the chopper 24 can be turned on and off rapidly in successive intervals to effect a desired average ON time and thereby provide a desired control of the power circuit.

The average motor current is controlled by controlling the ON-OFF time-ratio of the chopper, that is by controlling the ratio of ON time to OFF time. It may be noted that when chopper 24 is ON, the diode 33 is in the blocking direction with respect to line voltage so that no current flows through it. However, when the chopper is OFF, the diode 33 provides a path for the inductive motor current, forming a loop circuit through the motors, the diode 33 and reactor 32 so that the motor current decays at a rate determined by the CEMF (counter electromotive force) and constants of the circuit.

A current controller 60 supplies respective ON and OFF pulses to the chopper 24 as required in response to a comparison between requested current value and the actual motor system current in order to regulate the system in accordance with requested or commanded traction effort. Controller 60 is fully disclosed in the aforementioned U.S. Pat. application Ser. No. 711,109, and is the apparatus illustrated in FIG. 4 of that application.

Controller 60 is provided with a command signal input line 62 for receiving a command signal representing desired tractive effort. Controller 60 is also provided with a negative feedback input line 64 for receiving a signal representing the actual motor system current. In addition, controller 60 is provided with respective output lines connected to the ON and OFF terminals 48 and 50 of the chopper 24.

Command signals representing desired tractive effort or motor power, are supplied to input terminal 62 by a reference voltage source 66 shown in the form of a potentiometer, which may symbolize either a part of an automatic train control system or a manual controller. Potentiometer 66 is connected to a suitable voltage supply through a resistor 65. Potentiometer 66 is provided with a wiper contact 67 connected to line 62. Control signals received on line 62 are first modified by jerk limit and load weight circuits 68 and 70 before being applied to an input line 72 of a comparator 74, wherein they are compared to actual motor current feedback signals received via line 64 which is connected to another input of the comparator 74. A signal proportional to actual motor system current is derived from a suitable sensor 63 and applied to the input line 64 of the comparator 74. Although any suitable current sensing scheme may be employed, an example of a suitable system for producing a signal proportional to actual motor current is described in the aforesaid U.S. Pat. application Ser. No 711,109.

The output of the comparator 74 is utilized to control a pulse generator 76 in a manner to provide a pulse on the ON input line 48 of the chopper 24 when the actual motor system current is less than the requested current, and a pulse to the OFF input line 50 of the chopper when the actual motor circuit current is greater than the requested current. More specifically the output of comparator 74 is applied through a line 78 to the control input of the pulse generator 76. The pulse generator 76 may as in the aforementioned U.S. Pat. application Ser. No. 711,109 be comprised of two pulse generators controlled by the output of comparator 74, the output of one pulse generator being connected to the ON line 48, while the output of the other pulse generator is connected to the OFF line 50.

The function of the jerk limit circuit 68 is to limit the rate of change of an incoming command control signal to a predetermined maximum to limit the rate of change of acceleration or deceleration of the motors to an acceptable value for safety and comfort of passengers. A suitable circuit for this purpose is disclosed in U.S. Pat. application Ser. No. 711,103, filed Mar. 6, 1968, by Lalan G. Miller, and entitled "JERK LIMIT CIRCUIT FOR TRACTION MOTOR CONTROL SYSTEMS." The rate of acceleration of a rapid transit car is affected by the car weight, a greater tractive effort being needed to accelerate a fully loaded car than an empty car. The rate of acceleration is proportional to the applied tractive effort per unit of car weight, and since the weight will vary from time to time during operation of the car, the tractive effort must be adjusted accordingly to maintain a given rate of acceleration. This adjustment of the tractive effort is usually referred to as load weighing, and is provided in the present system by the load weight circuit 70, a suitable example of which is disclosed in U.S. Pat. application Ser. No. 711,002, filed Mar. 6, 1968, by Lalan G. Miller, and entitled "LOAD WEIGHT CIRCUIT FOR TRACTION MOTOR CONTROL SYSTEMS."

The traction system thus far described is the same as that disclosed in the aforementioned U.S. Pat. application Ser. No. 711,109.

When a chopper is used to control the accelerating current of a group of four DC series motors, the most desirable circuit connection is two motors in series and two series groups in parallel. However, if this circuit must run in train with conventional series-parallel cam control, then the motors must first be connected four in series or an artificial simulation of series must be incorporated. If four motors are connected in series and accelerated until full line voltage is applied, then at this point each motor must generate a CEMF equal to one-fourth of the applied line voltage. If the voltage applied to a parallel connected group of motors is artificially maintained at one-half of line voltage, then the voltage per motor will be one-fourth of line and the motors will accelerate along a characteristic curve corresponding to one that four motors in series would accelerate on.

In accordance with this invention, a voltage controller 80 is employed to simulate connection of all motors in series across the supply line during startup of the vehicle. The voltage controller 80 modifies the basic chopper control to afford constant voltage control instead of constant current control when necessary to hold the voltage of the motor system 10 to a predetermined fraction of the supply (line voltage), for example to provide one-fourth line voltage per motor in the four motor case. When the automatic train control or the operator calls for reduced voltage start by closing a switch 82, the voltage controller 80 compares the respective line and motor armature voltage, and when the armature voltage of one motor is equal to one-fourth of the line voltage, the voltage controller 80 overrides the current command signal from source 66 in a manner to control the chopper to reduce the motor system current to maintain one-quarter line voltage per motor as long as the vehicle operator or automatic train control is calling for this mode of operation.

In the voltage controller 80, a tap 84, of a voltage divider 86 connected across the supply lines 26 and 28, provides a voltage $E_S$ which is a measure of the line (supply) voltage. Likewise a tap 88 of a voltage divider 90 connected across the motor system 10 provides a voltage $E_M$ which is proportional to motor system voltage and this is a measure of the motor armature volts or motor CEMF. It should be noted that since $E_M$ is a measure of the motor system voltage, it is also in proportion to the voltage across any one of the motors in the system. Pursuing the example where one-fourth of line volts per motor are desired, the position of the intermediate taps 84 and 88 along their respective voltage dividers, is selected so that when the voltage $E_M$ equals one-half the line voltage, then $E_S = E_M$.

Within the voltage controller 80 is a voltage comparator 92 with input lines 94 and 96 connected to voltage divider taps 84 and 88 respectively, and which in response to $E_M > E_S$ provides an output on lines 98 and 100 which reflects that relation. The output on lines 98 and 100 thus provided when $E_M$ exceeds $E_S$, is utilized to turn on a transistor 102 which shorts the output of reference source 66 to ground, thus overriding the current command signal provided by source 66. The limiting resistor 65 protects the shorting transistor 102.

Although other suitable voltage comparators may be employed, the example shown at 92 provides excellent results. In the comparator 92 the base of a transistor 104 is connected to the comparator input line 96 while the emitter of this transistor is connected to the other input line 94 and to the negative DC terminal of a bridge rectifier 106. The positive output terminal of rectifier 106 is connected to the collector of transistor 104. A diode 108 is connected between the base and emitter of transistor 104.

The AC (alternating current) input terminals of rectifier 106 are connected across the secondary 110 of a transformer 112 whose primary 114 is connected in an AC circuit including the AC input terminals of a bridge rectifier 116, an AC source 118 and the switch 82. A resistor 122 and a filter capacitor 124 are connected in parallel across the DC output terminals of rectifier 116. Resistor 126 limits the base current into transistor 102. Output line 100 is connected to ground, to the lower end of resistor 122 and to the negative DC output terminal of rectifier 116. The upper end of load resistor 122 is connected through a resistor 126, a Zener diode 128 and lead 98 to the base of transistor 102. The collector of transistor 102 is connected to the output line of the current command reference source 66, while the emitter of that transistor is connected to ground, and line 100.

Switch 82 is operated to closed position when it is desired to operate the motors at a fixed percent of line volts per motor, for example during a startup phase. This switch may be operated manually or by an automatic train control system that provides correlated control of the entire traction system.

The components of comparator 92 are selected to provide the following mode of operation. With switch 82 in the closed position there will be current flow through the primary of transformer 114 depending on the loading of transformer 112. If transistor 104 is off (not conducting), there will be only exciting current flowing through the transformer primary circuit, and the voltage thereby developed across resistor 122 and applied to Zener diode 128 will be below the reverse breakdown voltage (Zener voltage) of the diode 128. As a result transistor 102 will be unaffected, that is, it will be in the OFF or nonconducting state. However if transistor 104 is turned on, the transformer will be loaded, resulting in a greater primary current flow and sufficiently high voltage to break down the Zener diode 128 and turn on transistor 102. As pointed out before when transistor 102 is turned on the current command reference 66 is grounded.

The voltage controller 80 operates as follows. When $E_M$ exceeds $E_S$, then a current will flow from base to emitter of transistor 104 causing that transistor to turn on and short the transformer secondary 110, thereby causing the primary circuit of the transformer to apply to the diode 128 a voltage higher than the breakdown voltage of the diode, thereby turning on the transistor 102. This causes the reference voltage supplied along line 72 to the comparator 74 to decay at a rate determined by the jerk limit circuit 68. As a result the pulse generator 76 transmits a pulse along line 50 to turn off the chopper 24. This causes the motor system current to decrease, and as the motor current is decreased, the motor system voltage will fall until the voltage $E_M$ becomes smaller than voltage $E_S$, at which time current will flow through diode 108 to cut off transistor 104. This, in turn, causes transistor 102 to turn off and reinstates the reference voltage supplied by source 66 to the current controller, thus causing the actual motor current to increase until the $E_M > E_S$, i.e., motor system voltage exceeds one half of the line voltage and transistor 104 turns on again. This action continues as long as switch 82 is closed, and effectively regulates the armature voltage.

Thus as long as switch 82 is open, the motor current is regulated in accordance with the requested current signal on line 72 as derived from the command signal from reference 66. However, if switch 82 is closed, the voltage controller overrides the command signal from reference 66 when the motor system voltage exceeds the predetermined fraction of the line voltage for which the apparatus is set.

It should be understood that the apparatus may be operated with the jerk limit and load weight circuits 68 and 70 omitted, by connecting line 62 to line 72 so as to apply the reference 66 directly to the input of comparator 74 except when shunted to ground by transistor 102. However it still would be desirable to insert a suitable filter circuit in the line 62–72 to smooth out abrupt changes. It should be noted that the jerk limit circuit 68 performs a filtering and smoothing function.

It should be apparent from the description herein that the breakdown voltage (Zener voltage) of the diode 128 is such that this diode effectively discriminates between the voltage caused by exciting current in the transformer 112 and load current voltage due to transistor 104 being turned on.

The disclosed apparatus provides series simulation for a plurality of motors connected in a series-parallel system. The invention may also be practiced by detecting the voltage across one of the motors and supplying this voltage as $E_M$ to line 88. The voltage across anyone of the motors is a function of the motor system voltage.

It should be understood that the specific embodiment of the invention disclosed herein is by way of example only and is not to be construed as limiting the invention thereto.

We claim:
1. Electrical apparatus comprising:
 A. a motor system;
 B. direct current supply means;
 C. a controllable chopper having a power circuit connected in series between the direct current supply means and the motor system, said chopper having a control circuit responsive to control signals for controlling the chopper so as to control the power flow from said supply means to said motor system;
 D. current control means for applying to said control circuit a command signal representing desired motor system current for controlling the chopper to provide actual motor system current in accordance with the command signal; and
 E. voltage control means for overriding said current command signal to hold said motor system voltage at a predetermined fraction of the supply voltage.

2. The combination as in claim 1 wherein said voltage control means comprises:
 F. means for providing a first signal that is a function of the supply voltage;
 G. means for providing a second signal that is a function of the motor system voltage; and
 H. control means responsive to said first and second signals for turning said chopper off when the motor system voltage exceeds a predetermined fraction of the supply voltage and turning said chopper on when the motor system voltage drops below said predetermined fraction, whereby said motor system voltage is regulated to a predetermined fraction of the supply voltage.

3. The combination as in claim 1 wherein said motor system comprises a plurality of motors connected in series-parallel.

4. The combination as in claim 1 wherein said motor system includes a plurality of motors connected in series-parallel, and wherein said voltage control means regulates said motor system to a predetermined fraction of the supply voltage such that the voltage across each motor is limited to the value that would be obtained across the motor if all the motors were connected in series across the supply voltage.

5. The combination as in claim 2 wherein said motor system comprises a plurality of motors connected in series-parallel.

6. The combination as in claim 2 wherein said motor system includes a plurality of motors connected in series-parallel, and wherein said voltage control means regulates said motor system to a predetermined fraction of the supply voltage such that the voltage across each motor is limited to the value that would be obtained across the motor if all the motors were connected in series across the supply voltage.

7. The combination as in claim 2 wherein said control means H comprises means for shorting said command signal to ground when the motor system voltage exceeds said predetermined fraction of the supply voltage.

8. The combination as in claim 1 wherein said voltage control means comprises:
 I. means for providing a first signal that is a function of the supply voltage;

J. means for providing a second signal that is a function of the motor system voltage;
K. means for comparing said first and second signals to provide a control output dependent on relations between said signals; and
L. means responsive to said control output when the motor system voltage exceeds a predetermined fraction of the supply voltage for overriding said current command signal and controlling said chopper to regulate the motor system voltage to a predetermined fraction of the supply voltage.

9. The combination as in claim 8 wherein said motor system includes a plurality of motors connected in series-parallel, and wherein said voltage control means regulates said motor system to a predetermined fraction of the supply voltage such that the voltage across each motor is limited to the value that would be obtained across the motor if all the motors were connected in series across the supply voltage.